Patented Mar. 31, 1925.

1,531,623

UNITED STATES PATENT OFFICE.

SAMUEL PEACOCK, OF WHEELING, WEST VIRGINIA, ASSIGNOR TO WILLIS G. WALDO, OF WASHINGTON, DISTRICT OF COLUMBIA.

PROCESS OF PRODUCING ALKALI METALS.

No Drawing.  Application filed October 17, 1921. Serial No. 508,261.

*To all whom it may concern:*

Be it known that I, SAMUEL PEACOCK, a citizen of the United States, residing at Wheeling, in the county of Ohio and State of West Virginia, have invented certain new and useful Improvements in Processes of Producing Alkali Metals; and I do hereby declare the following to be a full, clear, and exact description of the invention, such as will enable others skilled in the art to which it appertains to make and use the same.

This invention relates to a process of producing alkali metals such as sodium and potassium in their elemental forms, and has for its object to obtain said metals by procedures which will be less costly and more efficient than those heretofore proposed.

With these and other objects in view, the invention consists in the novel steps and combinations of steps constituting the process, all as will be more fully hereinafter disclosed and particularly pointed out in the claims.

In carrying out this invention, one may employ anhydrous sodium silicate $Na_2SiO_3$ or anhydrous potassium silicate $K_2SiO_3$. The oxides of these elements $Na_2O$ and $K_2O$ occur as intermediate compounds in the formation of alkali metal silicates in general, and I prefer to employ for this process those basic silicates which when decomposed will produce a maximum amount of these oxides, such, for example, as $Na_4SiO_4$. I next mix the alkali metal silicate selected with charcoal in a fine state of sub-division or with some other form of carbon in a high state of purity. The quantity of carbon is preferably in excess of that theoretically required and the charge thus produced is next heated in a closed furnace to a temperature between, say, 900° C. and 1300° C. although I find that a temperature of about 1100° C. or 1200° C. is preferable, for in the case of sodium at such temperatures in the presence of carbon the silicate breaks down to silica $SiO_2$ and sodium oxide $Na_2O$ and the latter is immediately reduced in an atmosphere free from oxygen to the metallic state substantially in accordance with the following equation, when the mono-silicate is employed:

$$Na_2SiO_3 + C = Na_2 + CO + SiO_2$$

The elemental sodium thus produced is 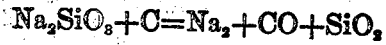 driven off in the form of a vapor mixed with carbon monoxide gas CO and is preferably led into any suitable and well known condensing apparatus where it is condensed to the liquid form, and separated from the said gas by allowing it to settle to the bottom of the apparatus. But during the process of condensation a certain amount of sodium carbonyl $Na(CO)_2$ is inevitably formed, which causes a loss of sodium and therefore a loss in efficiency when carbon is employed, as a reducing agent. When it is desired to avoid this loss, elemental silicon or ferro silicon $FeSi_2$ may be employed as a reducing agent. This elemental silicon, or ferro silicon is preferably finely pulverized when used, and when employed the reaction proceeds in accordance with the following equation in the case of ferro-silicon:

$$4Na_2SiO_3 + FeSi_2 = 4Na_2 + 6SiO_2 + Fe.$$

In this reaction only the elemental sodium Na is vaporized and no loss in efficiency or trouble in the condensation of the same is encountered. It should be noted that this last mentioned reaction takes place only because the elemental sodium being volatile, at the temperature stated, it is removed from the phase immediately upon its production. Otherwise, if the sodium remained in the reacting mass it would at once combine with the silica $SiO_2$ present to form elemental silicon Si.

Therefore, the commercial success of the operation is largely dependent upon the elimination of the elemental sodium in the vapor form as fast as it is produced. To facilitate this reaction, it is desirable but not absolutely essential to provide a suction in the condensation system so that the reaction will take place under a minus pressure instead of at atmospheric pressure as is usual in retort furnaces.

In other words, I find that by maintaining in the reaction chamber a sodium partial pressure somewhat under the normal, I am enabled not only to prevent the reduction of the silica present, but also to effect a more rapid reaction velocity at a given temperature.

What I claim is:

1. The process of producing an alkali metal which consists in reacting on its corresponding anhydrous silicate with a reducing agent containing silicon at temperatures between 800° C. and 1300° C. to separate said metal in its elemental condition from its silicate combinations; and recovering the metal thus separated, substantially as described.

2. The process of producing metallic sodium which consists in reacting on anhydrous sodium silicate with elemental silicon to drive off metallic sodium and carbon monoxide; and recovering said sodium, substantially as described.

In testimony whereof I affix my signature.

SAMUEL PEACOCK.